UNITED STATES PATENT OFFICE.

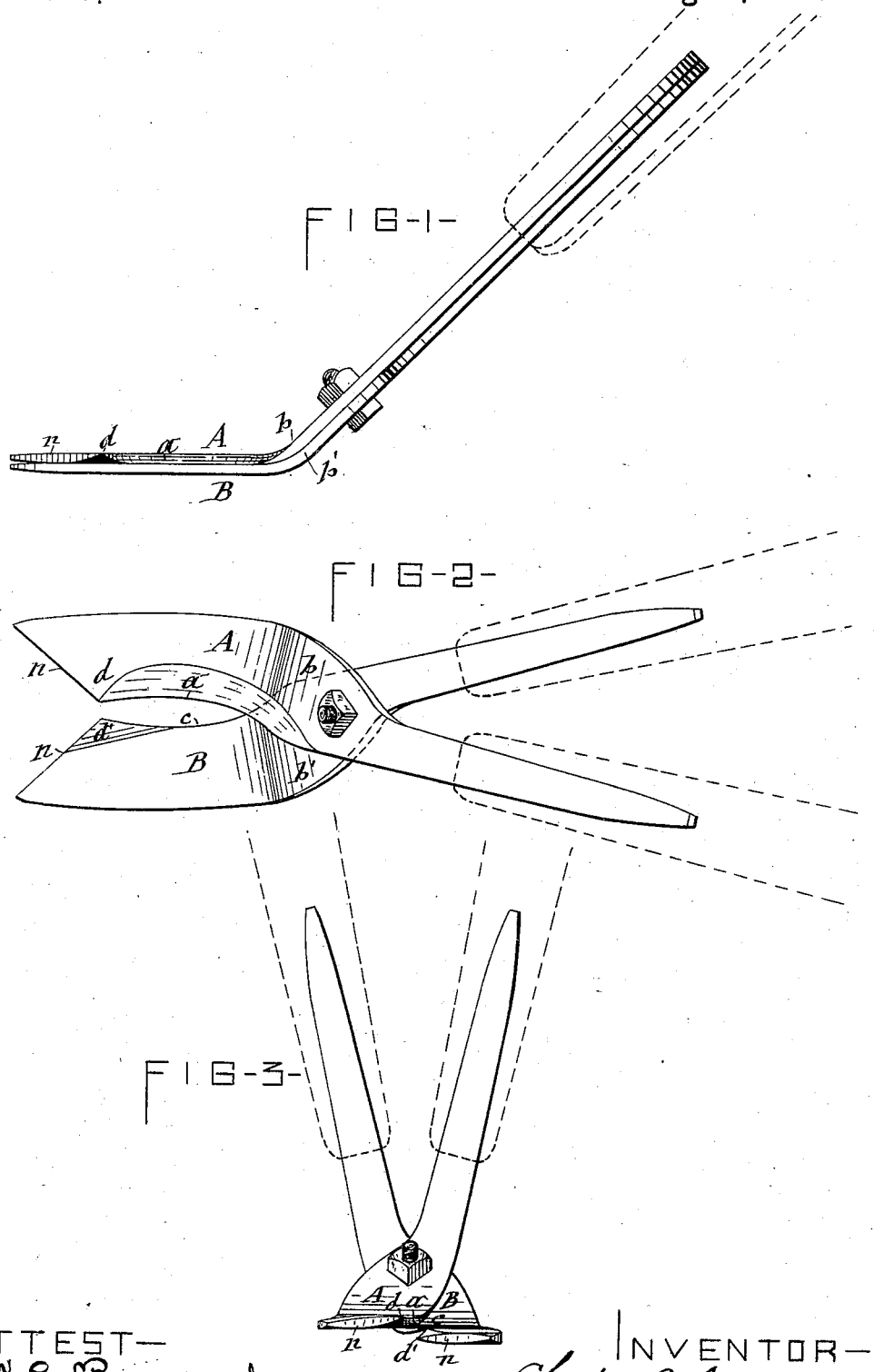

CHARLES C. NAGLEY, OF MEMPHIS, NEW YORK.

TOBACCO-PLANT CUTTER.

SPECIFICATION forming part of Letters Patent No. 323,718, dated August 4, 1885.

Application filed April 24, 1885. (No model.)

*To all whom it may concern:*

Be it known that I, CHARLES C. NAGLEY, of Memphis, in the county of Onondaga, in the State of New York, have invented new and useful Improvements in Tobacco-Plant Cutters, of which the following, taken in connection with the accompanying drawings, is a full, clear, and exact description.

This invention consists in a novel construction of the cutting-edges of the shearing-blades, whereby the implement is rendered more efficient in its operation, as hereinafter more fully explained, and specifically set forth in the claims.

In the annexed drawings, Figure 1 is a side view of my improved tobacco-plant cutter. Fig. 2 is a plan view of the same, and Fig. 3 an end view.

A and B designate the two shearing-blades of the tobacco-cutter. The blade A is formed with the concave cutting-edge $a$, beveled on its upper side, and the blade B is pivoted to the under side of the blade A, and formed with the concave cutting-edge $c$, beveled on its under side, both of said blades having back of their cutting-edges the usual upward bend, $b\ b'$, to carry the handle at such an angle as to allow the operator to stand nearly or quite erect in the operation of cutting the tobacco-plants. The front ends of the blades A and B are flared or tapered divergent from each other, as shown at $n\ n$ in Fig. 2 of the drawings, to guide the implement in its application to the plant to be cut. The junction of the tapered end portions with the concave cutting-edges forms projecting points $d\ d'$ on the blades.

In the operation of the cutter the shearing-blades are opened sufficiently to allow the stalk of the plant to pass between the points $d\ d'$ and back between the cutting-edges $a\ c$, which by their concave shape obtain a firm hold on the stalk while cutting the same.

In order to guard against the collision of the two points $d\ d'$ in closing the shearing-blades A B, I bevel said points or ends of the cutting-edges reversely from the main portion thereof—*i. e.*, the blade A, which has its cutting-edge $a$ beveled on its upper side, has its point $d$ beveled on the under side, and the blade B, which has its cutting-edge $c$ beveled on the under side, has its point $d'$ beveled on the upper side.

An implement thus constructed is capable of cutting tobacco-plants expeditiously and with great facility.

Having described my invention, what I claim as new, and desire to secure by Letters Patent, is—

1. A tobacco-plant cutter composed of shearing-blades pivoted one to the under side of the other, and having the cutting-edge of the upper blade beveled on its under side at the free end thereof, and the corresponding portion of the cutting-edge of the lower blade beveled on its upper side, substantially as and for the purpose specified.

2. The combination of the blade A, formed with the concave cutting-edge $a$, beveled on its upper side, and having the point $d$ beveled on its under side, and the blade B, pivoted to the under side of the blade A, and formed with the concave cutting-edge $c$, beveled on its under side, and having the point $d'$ beveled on its upper side, substantially as described and shown, for the purpose set forth.

In testimony whereof I have hereunto signed my name and affixed my seal, in the presence of two attesting witnesses, at Syracuse, in the county of Onondaga, in the State of New York, this 13th day of April, 1885.

CHARLES C. NAGLEY. [L. S.]

Witnesses:
 C. BENDIXON,
 WM. C. RAYMOND.